United States Patent [19]
Hwang

[11] Patent Number: 5,929,772
[45] Date of Patent: Jul. 27, 1999

[54] DATA PROCESSING DEVICE AND METHOD FOR USE IN A PAGING RECEIVER

[75] Inventor: Seon-Woong Hwang, Yongin, Rep. of Korea

[73] Assignee: Samsung Electronics Co., Ltd., Rep. of Korea

[21] Appl. No.: 08/741,391

[22] Filed: Oct. 29, 1996

[30] Foreign Application Priority Data

Aug. 12, 1996 [KR] Rep. of Korea .................. 33453/1996

[51] Int. Cl.[6] .................................................. H04Q 7/00
[52] U.S. Cl. ............................... 340/825.44; 340/825.7; 340/825.27; 340/825.47; 370/311; 370/314; 370/312; 370/464; 370/313; 455/434; 455/32.1; 455/515; 455/343; 455/38.3
[58] Field of Search ........................... 340/825.44, 825.7, 340/825.47, 825.27; 455/343, 38.3, 434, 32.1, 515; 370/311, 314, 312, 464, 313

[56] References Cited

U.S. PATENT DOCUMENTS

| 4,914,694 | 4/1990 | Schwendeman et al. | 370/311 |
| 5,206,855 | 4/1993 | Schwendeman et al. | 340/825.44 |
| 5,369,799 | 11/1994 | Tsunoda | 455/38.3 |
| 5,376,929 | 12/1994 | Rakolta et al. | 340/825.44 |

*Primary Examiner*—Brian Zimmerman
*Assistant Examiner*—Yves Dalencourt
*Attorney, Agent, or Firm*—Dilworth & Barrese

[57] ABSTRACT

A data processing device of a paging receiver having a controller for analyzing decoded paging data and for performing a paging function, wherein address data and message data of all frames are decoded and transmitted to the controller at a section of a received data stream during a scan mode of operation and, the address data and message data of a preset frame section are decoded and transmitted to the controller during a normal mode of operation.

16 Claims, 10 Drawing Sheets

| msb | | | | | | | | | | | | |
|---|---|---|---|---|---|---|---|---|---|---|---|---|
| A0 | A1 | A2 | A3 | · · · | A16 | A17 | F0 | F1 | F2 | U0 | U1 | EN |

Fig. 8B

| msb | | | | | |
|---|---|---|---|---|---|
| 0 | 0 | 0 | U0 | U1 | F0 | F1 |

0, 0, 0, U0, U1, F0, F1

Fig. 8C

| msb | | | | | | | | | | | |
|---|---|---|---|---|---|---|---|---|---|---|---|
| 1 | 0 | Eb | Ep | M0 | M1 | M2 | M3 | · · · | M16 | M17 | M18 | M19 |

DATA PROCESSING DEVICE AND METHOD FOR USE IN A PAGING RECEIVER

BACKGROUND OF THE INVENTION

1. Field of the Invention

The present invention relates to a data processing device and method of a paging receiver, and more particularly to a data processing device which can receive data by having a scan mode and a normal mode and a method of use thereof. A data processing device and method of use according to the present invention is based on Korean Patent Application No. 33453/1996, which is incorporated herein by reference.

2. Description of the Related Art

Figure 1:
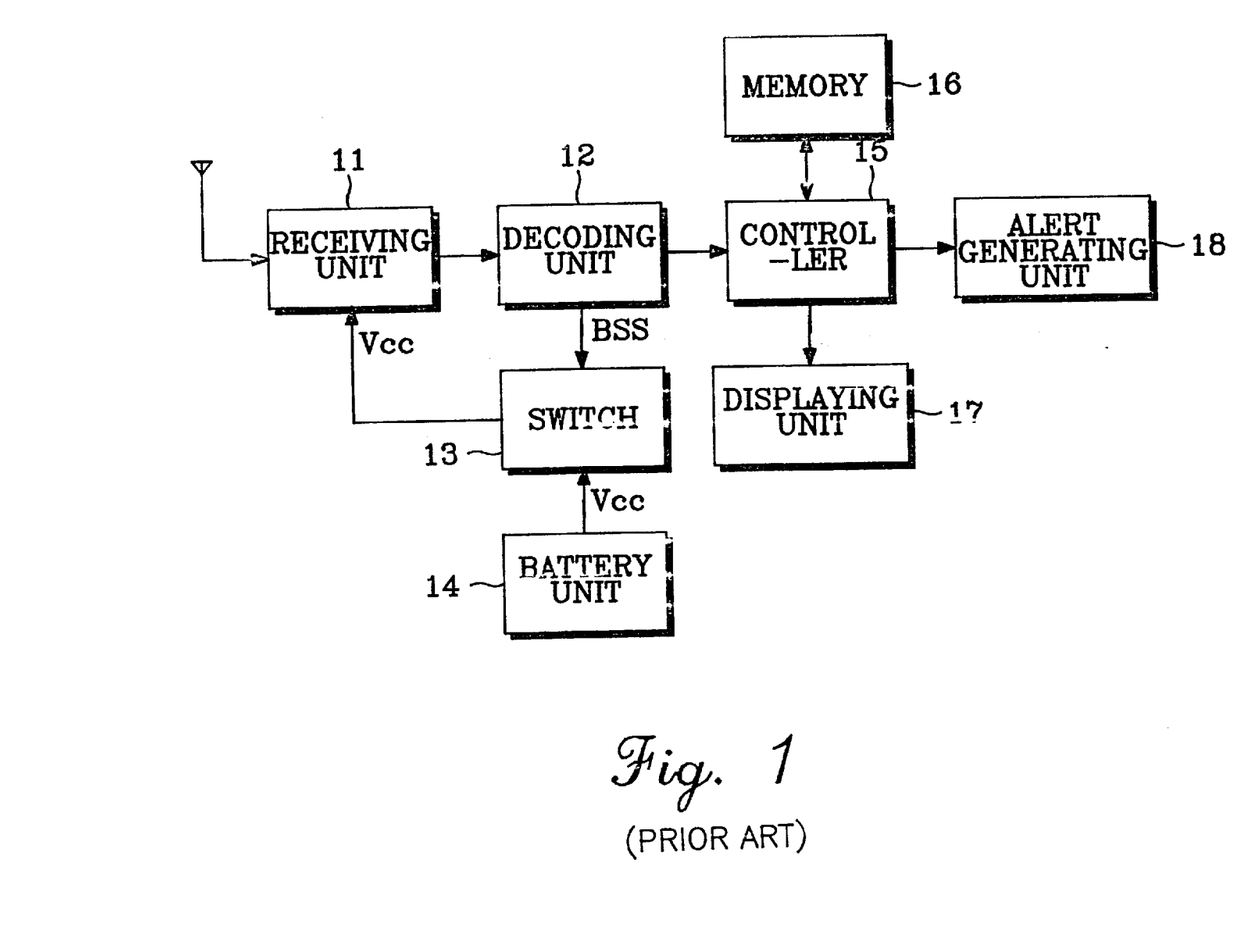
FIG. 1 is a block diagram showing a configuration of a paging receiver according to a prior art.

Generally, a paging receiver receives and analyzes a specific form of paging information, and then if the paging information relates to the user, performs an alert function. FIG. 1 shows a general configuration of the paging receiver in the prior art. Referring to FIG. 1, a receiving unit 11 receives paging information and performs frequency conversion, demodulation and waveform shaping operations on the paging information. That is, the receiving unit 11 provides the paging information, which is converted into digital data, to a decoding unit 12. The decoding unit 12 decodes the received data and then sets an operation mode of the paging receiver. That is, the decoding unit 12 controls the supply of operating power at a predetermined time period in order to detect preamble data in a received data stream during operation in an idle mode, while supplying the operating power during the cycle of the wordsync data and preset frame data during operation in a batch mode.

When operating in the batch mode, the decoding unit 12 decodes the detected frame data and performs a data conversion operation. A controller 15 receives the decoded data from the decoding unit 12, processes the received data and controls an alerting function. The controller 15 has a read only memory (ROM) for storing a program and a random access memory (RAM) for temporarily storing the data generated during the program processing. A microprocessor or a microcontroller can be used for the controller 15. An alert generating unit 18 generates an alert signal, for example, an alert tone signal or a vibration signal, for informing the user that the paging receiver is in a called state in response to an alert control signal output from the controller 15. A displaying unit 17 displays a message from a calling party and information regarding the operating state of the paging receiver in response to a display control signal output from the controller 15. A liquid crystal display LCD may be used for the displaying unit 17. A memory 16 stores inherent address information and frame information assigned to the paging receiver. An erasable electronic programmable ROM (EEPROM) may be used for the memory 16.

Formats of the Post Office Code Standardization Advisory Group (POCSAG) code may be used by the paging receiver and are described in greater detail below with reference to FIG. 2.

Figure 2:
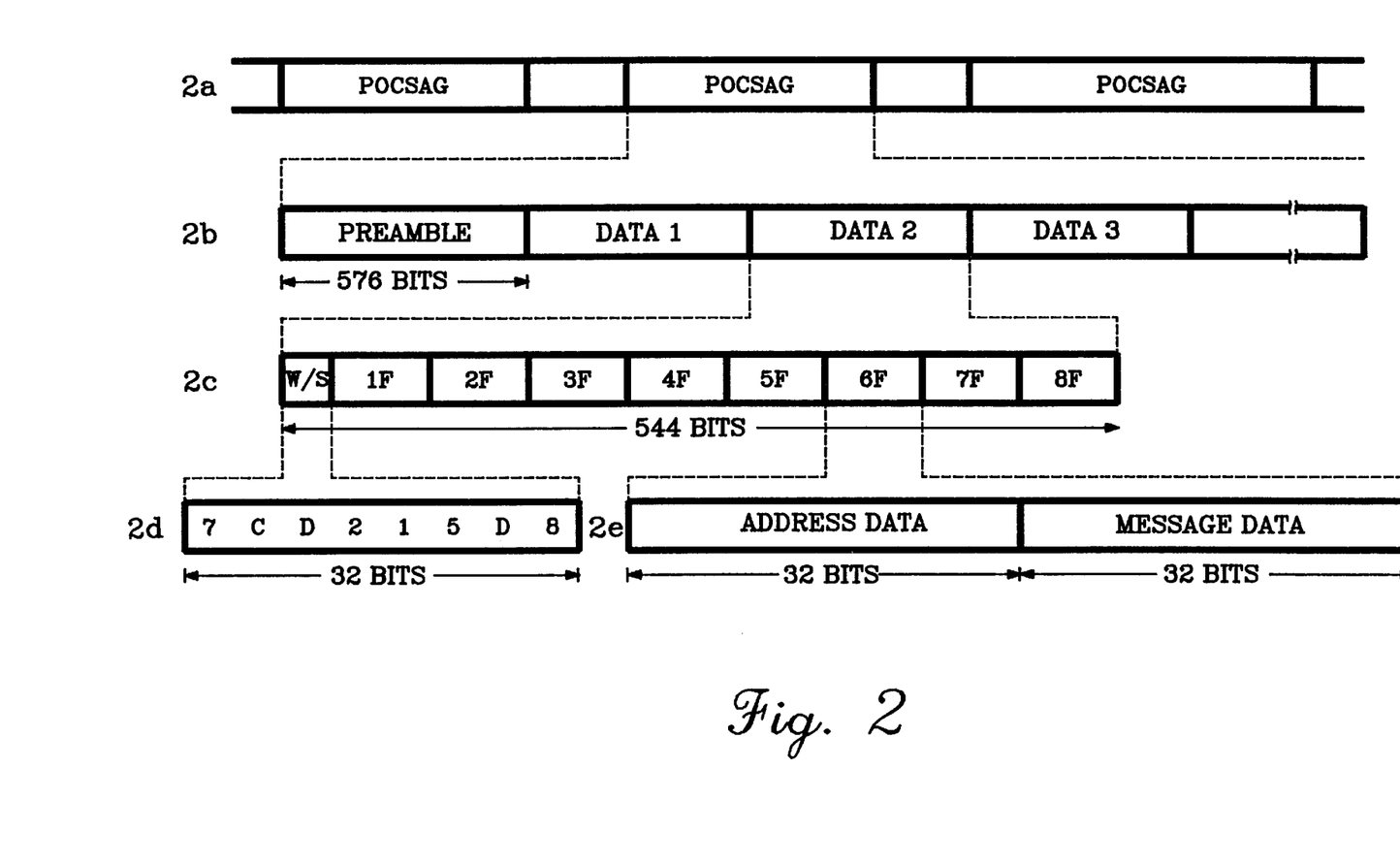
FIG. 2 is a format representative of the POCSAG code used in the paging receiver.

The POCSAG code is generated as shown in 2a of FIG. 2. A single element of POCSAG code is composed of preamble data consisting of 576 bits, and a plurality of batch data which follow the preamble data, as shown in 2b of FIG. 2. Typically, the preamble data is a reversal code which includes a repetitive pattern of binary "1"s and "0"s. The single element of POCSAG code contains from 30 (normal) to 60 (maximum) batches. One batch consists of wordsync (w/s) data composed of 32 bits, and eight frame data sequences each composed of 64 bits as shown in 2c of FIG. 2.

2. The wordsync data having 32 bits includes, for example, $(7CD215D8)_{HEX}=(01111100110100100001010111101100)_{BINARY}$ as shown in 2d of FIG. 2. Each of the frame data includes 32 bits of an address codeword and 32 bits of a message codeword, as shown in 2e of FIG. 2. Therefore, one batch contains an amount of data equal to 17 words each composed of 32 bits of data, i.e., 544 bits of data (17 words×32 bits=544 bits).

A whole country may be divided into several regions, each independently having a paging service system and each using its own preset channel frequency. Thus, a subscriber of the paging receiver subscribed to the paging service system in one region can be provided with the paging service only in the corresponding region where his paging receiver is subscribed. That is, a conventional paging service system has a frequency generator for generating a fixed channel frequency so as to detect the frequency transmitted from the paging service system where the paging receiver is subscribed. Accordingly, in the conventional paging receiver, it is impossible to provide the paging service to the subscriber of the paging receiver if he is away from the service region.

In order to overcome this problem, wide area paging service systems have been developed. The paging receiver subscribed to the wide area paging service system determines the region where the paging receiver is located during initial operation, and then is provided with the paging service via the channel frequency of a corresponding region. The paging receiver subscribed to the wide area paging service system must have a frequency synthesizer capable of tuning a plurality of channel frequencies used in respective regions and the memory therein must store the channel data of respective regions and a capcode for performing the paging service at a corresponding channel.

The wide area paging receiver as described above must be able to continuously perform a channel scan operation so as to detect the reference channel frequency within a short time in the event that the paging receiver is transported to another region. During the channel scan operation, if the region information is determined by detecting the reference channel frequency, the paging receiver is tuned to the channel frequency of a corresponding region, thereby establishing the paging service in the corresponding region. Thus, the wide area paging receiver requires a continuous power supply to check where the paging receiver is located, besides the general battery control operation during initial operation. For this, the wide area paging receiver must be able to detect the address codewords of all frames in a data stream to be transmitted.

SUMMARY OF THE INVENTION

An object of the present invention is, therefore, to provide a device and method of use thereof for use with a paging receiver which can receive/transmit all frame data during a scan mode.

It is another object of the present invention to provide a device and a method of use thereof for use with a paging receiver which can receive and analyze the address data of all frames which contain region information and which are transmitted from a paging service system, thereby enabling an immediate checking of the region information.

It is still another object of the present invention to provide a device and method of use thereof for use with a paging receiver which continuously transmits received addresses to a controller by operating in a scan mode during initial operation, and after channel scanning, cuts off the transmission of the address during operation in a normal mode.

To achieve the above objects of the present invention, a data processing device of a paging receiver having a controller for analyzing decoded paging data and thus performing a paging function is characterized in that in a scan mode, the address data and message data of all frames are decoded and transmitted to the controller at the section where a data stream is received and in a normal mode, in which the address data and message data of a preset frame section are decoded and transmitted to the controller.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENT

A preferred embodiment of the present invention will be discussed with reference to the accompanying drawings. It should be noted that the same parts or elements of the drawings represent the same number or symbol wherever possible.

In a preferred embodiment of the present invention, a paging receiver operates in a scan mode and a normal mode. The paging receiver receives and processes the data of all frames during the scan mode, while receiving the data of preset frame and processing a paging function during the normal mode. The term "data" means the address data and the message data. In the illustrative preferred embodiment of the present invention, for example, when the paging service system transmits the address data as shown in 2d of FIG. 2 containing the region (or channel frequency) information of a corresponding paging service system, the paging receiver receives and analyzes the address data, checks the transmission channel frequency of the corresponding paging service system, sets the channel frequency and then operates in the normal mode.

Figure 3:
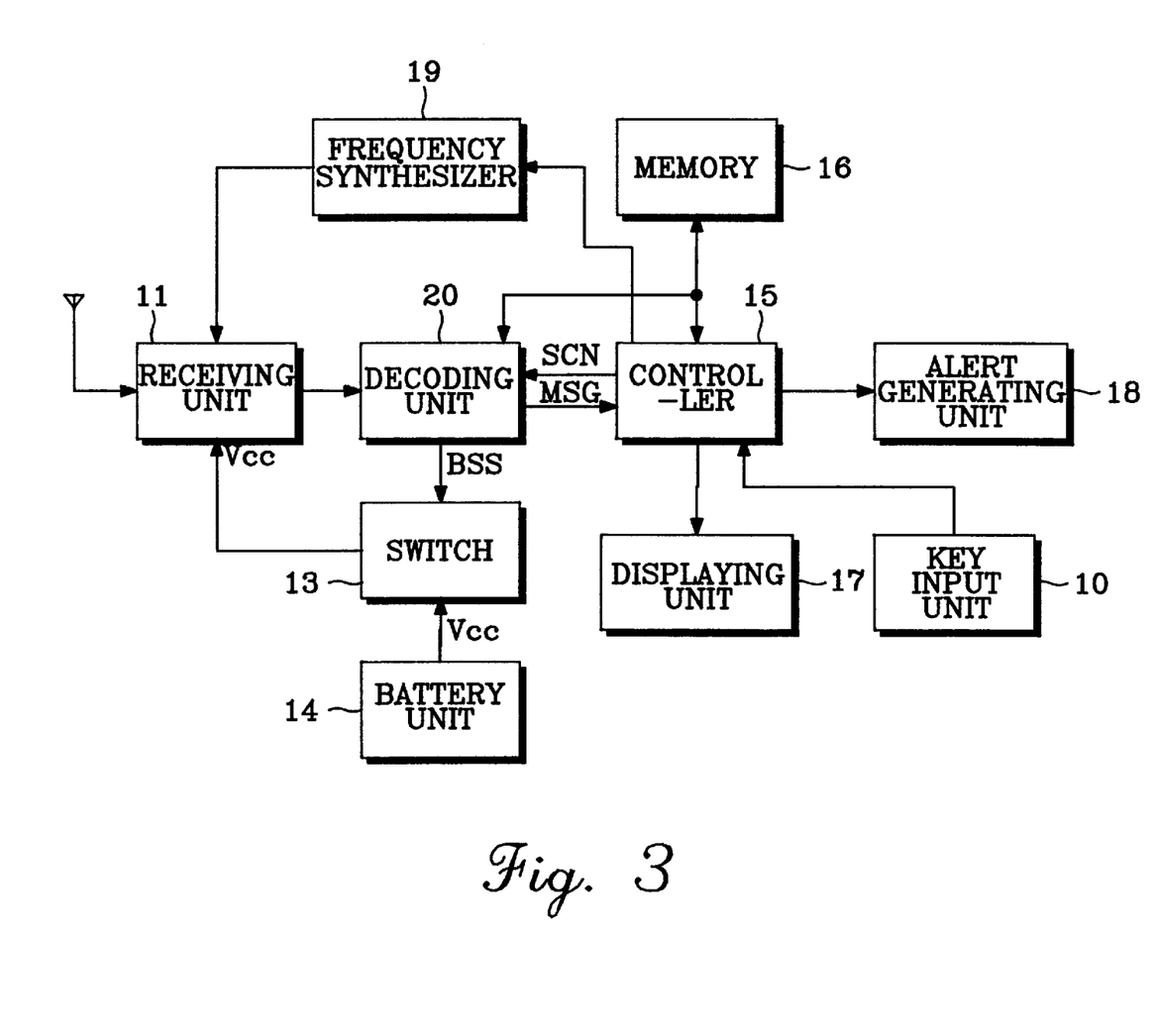
FIG. 3 is a block diagram showing a configuration of a paging receiver according to the present invention.

FIG. 3 is a block diagram showing an illustrative configuration of a paging receiver according to the present invention. A key input unit 10 includes a plurality of keys for generating various control signals of the paging receiver, e.g. a power key for turning on/off the operation of the paging receiver, a mode key for setting the performance of the paging receiver in a channel scan mode, a read key for displaying stored messages, etc.

A receiving unit 11 uses a channel which is designated by a frequency synthesizer 19, and converts an RF signal of the designated channel which is received via an antenna into digital data. That is, the receiving unit 11 amplifies a weak RF signal, and performs frequency conversion, demodulation and waveform shaping operations. In this case, the digital data is the data coded using, for example, a binary-coded hexadecimal (BCH) method.

A decoding unit 20 has a battery controller and a decoding and transmitting unit. During initial operation, the battery controller outputs a scan battery saving signal SBSS which continuously stays at an "on" state at the reception cycle of the data stream by a scan control signal SCN, thereby controlling the decoding unit 20 to continuously receive the data stream. During normal operation, the battery controller outputs a normal battery saving signal NBSS, thereby controlling the decoding unit 20 to receive a preset frame of the data stream. The decoding and transmitting unit detects and transmits the address and message data of continuously input frames in response to the scan control signal SCN, and, during the normal mode, transmits the corresponding address information and message if the corresponding address is detected in the preset frame.

A battery unit 14 supplies operating power to each unit of the paging receiver. A battery may be used for the battery unit 14. The switch 13 is connected between the battery unit 14 and the receiving unit 11 and is switched on/off by a battery saving signal BSS output from the decoding unit 20, thereby switch-connecting the operating power to the receiving unit 11.

A memory 16 stores information on the paging receiver, and an EEPROM may be used for the memory 16. The memory 16 stores the capcode which includes the preset inherent address data and frame data and the channel frequencies of the regions.

A controller 15 controls the paging function of the paging receiver. If the mode key is received from the key input unit 10, the controller 15 operates in the scan mode and thereafter operates in the normal mode. The controller 15 outputs the scan control signal SCN to the decoding unit 20 and analyzes the data received from the decoding unit 20 during the scan mode, and then operates in the normal mode. During the normal mode, if the address data received at the preset frame section is identical to the inherent address, the controller 15 receives the message and then performs the paging function.

A frequency synthesizer 19 designates the channel frequency of the receiving unit 11 according to the channel data output from the controller 15. A display unit 17 displays the received messages and various states generated during a paging service under the control of the controller 15. An LCD may be used for the display unit 17. An alert generating unit 18 generates an alert signal upon the reception of the message under the control of the controller 15. The alert generating unit 18 includes a circuit for generating an alert tone and a vibrator for generating a vibration signal.

Referring to FIG. 3, if the mode key is input from the key input unit 10, the controller 15 outputs the scan control signal SCN to the decoding unit 20 to operate in the scan mode. Then, the decoding unit 20 performs the scan mode and transmits the data stream for all frames within the batch to the controller 15. The controller 15 analyzes the region information contained in the address data from the continuously received data stream, and determines the region where the paging receiver is presently located. After determining the region, the controller 15 outputs the channel data of a corresponding region to the frequency synthesizer 19 and then clears the scan control signal SCN. Then, the paging receiver ends operating in scan mode and operates in the normal mode for the paging function.

Figure 4:
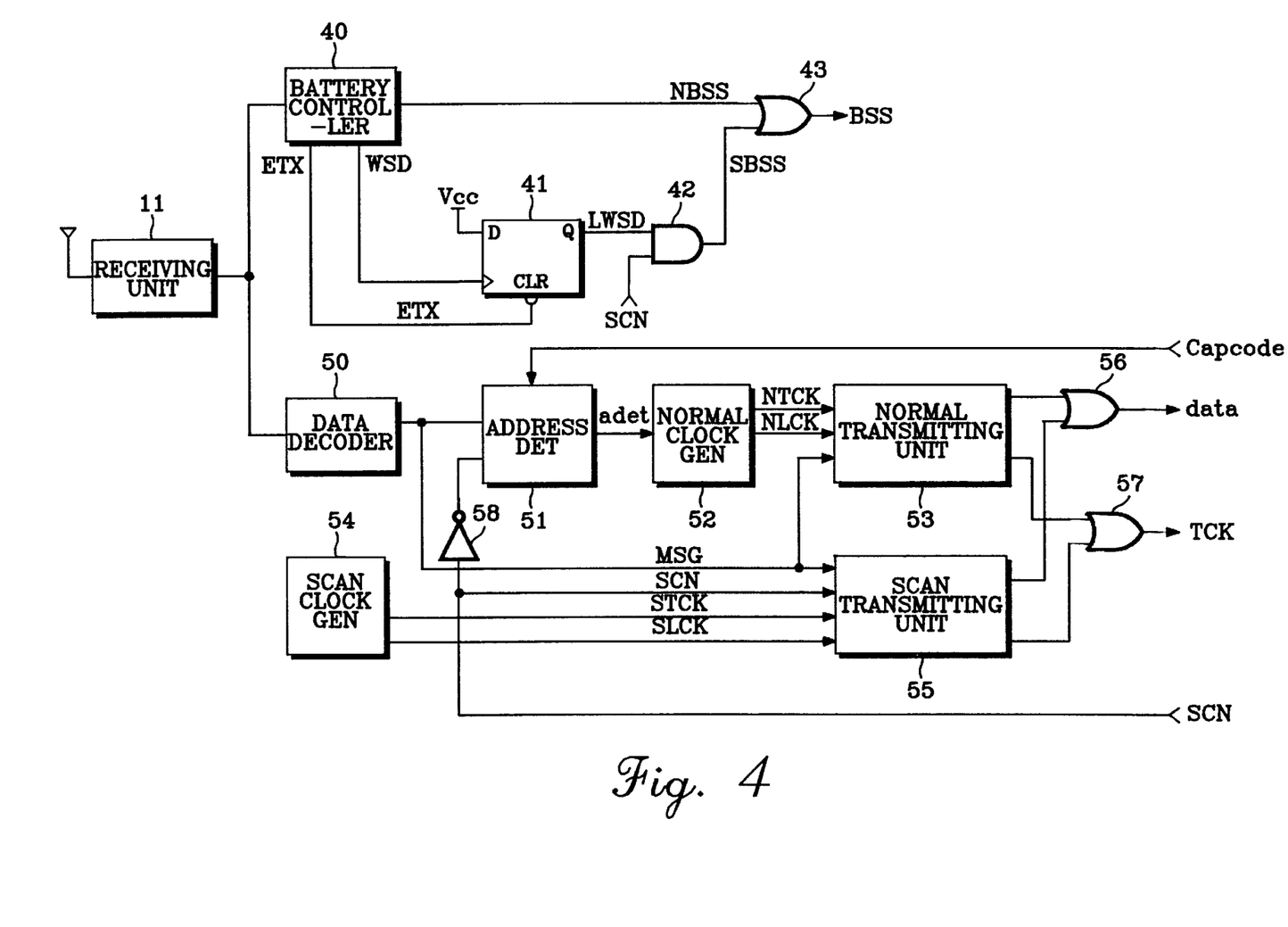
FIG. 4 is a diagram showing a decoding unit for controlling the data transmission in a paging receiver according to the present invention.

FIG. 4 shows an illustrative embodiment of the decoding unit 20 according to the present invention, which is largely divided into a battery controller 40 and the decoding and transmitting unit. The battery saving device disclosed in U.S. patent application Ser. No. 08/544,801 can be used for the battery controller 40.

In a preferred embodiment of the present invention, since the power supply is variably controlled according to the scan mode and the normal mode, the battery saving signal BSS appropriate to corresponding mode should be generated. That is, since the data of all frames must be received during the scan mode, the battery saving signal BSS must be generated during all frame sections, and while operating in the normal mode, the battery saving signal BSS must be generated only in a preset frame section.

For this reason, a battery saving signal generated during the scan mode should be different from the battery saving signal generated during the normal mode. Hereinafter, the battery saving signal generated during the scan mode will be referred to as a scan battery saving signal SBSS. Referring to the generation of the scan battery saving signal SBSS, a flip-flop 41 receives as an input a wordsync detection signal WSD output from the battery controller 40 as a clock, and receives as an input an end transmission detection signal ETX output from the battery controller 40 as a clear signal. Thus, the flip-flop 41 generates a data section signal LWSD which is activated upon the generation of the initial wordsync detection signal WSD and is deactivated upon the generation of the end transmission detection signal ETX. Therefore, the data section signal LWSD output from the flip-flop 41 is activated during the batch mode of the paging receiver and is deactivated during the idle mode.

An AND gate 42 ANDs the data section signal LWSD and the scan control signal SCN output from the controller 15. The scan control signal SCN is generated from the controller 15 during initial operation so as to detect the region where the paging receiver is presently located. After detecting the present region during initial operation, the controller 15 deactivates the scan control signal SCN. Thus, the AND gate 42 generates a scan battery saving signal SBSS for controlling the power of the receiving unit 11 during the scan mode, i.e. during the activation of the scan control signal SCN. Then, an OR gate 43 outputs the scan battery saving signal SBSS as the battery saving signal BSS. In this case, the scan control signal SBSS is activated in all frame sections regardless of its frame cycle. Thus, the receiving unit 11 receives the data stream of all frames at the section where the data is received.

In this state, if the controller 15 deactivates the scan control signal SCN, the AND gate 42 cuts off the path of the scan battery saving signal SBSS. The OR gate 43 outputs a normal battery saving signal NBSS output from the battery controller 40 as the battery saving signal BSS. Then, the receiving unit 11 processes the data received in its frame data section.

A data decoder 50 is connected to the receiving unit 11 and receives the data stream output from the receiving unit 11. The data decoder 50 receives and decodes the BCH coded address codeword and message codeword and then outputs the decoded address and message data.

Figure 5:
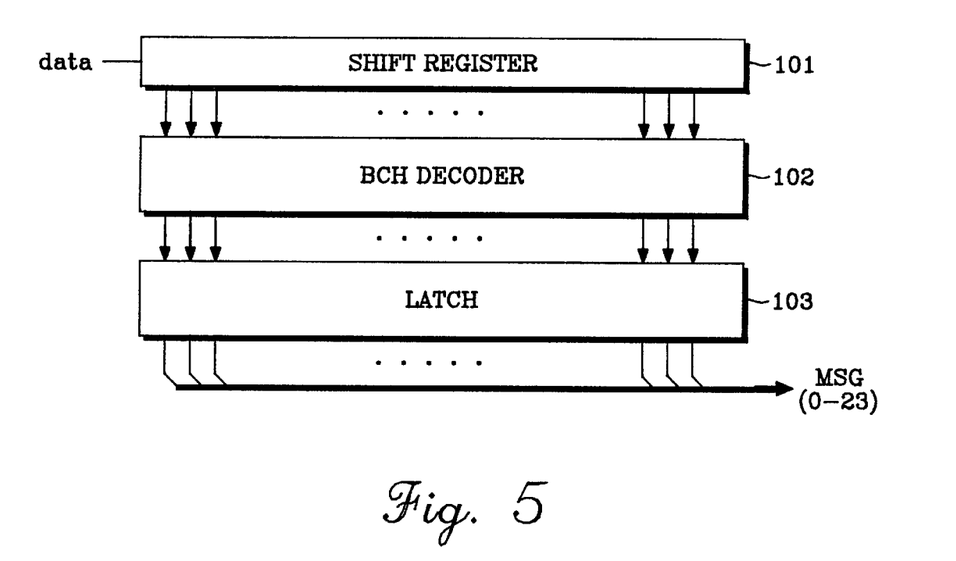
FIG. 5 is a diagram showing a configuration of a data decoder in FIG. 4.
Figure 8A:
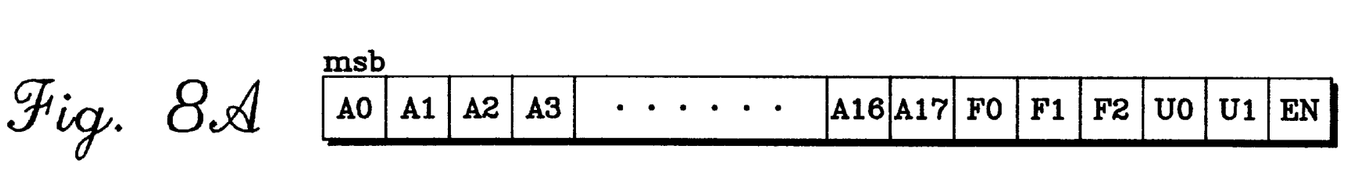
FIGS. 8A, 8B and 8C are diagrams showing the format of address data and message data output from the data decoder in FIG. 4.

FIG. 5 shows an illustrative embodiment of the internal structure of the data decoder 50. Referring to FIG. 5, a shift register 101 receives the 32 bits of address codeword and message codeword and converts the received codewords into 32 bits of parallel data. The shift register 101 shifts and stores the serial data output from the receiving unit 11 and parallel-outputs the address data and message data in a codeword determined by a control signal (not shown). A BCH decoder 102 decodes the 32 bits of codeword data output from the shift register 101 and then outputs 24 bits of parallel data. In this case, if the data output from the BCH decoder 102 is an address, this address is output with the pattern as shown in FIG. 8A. On the contrary, if the data output from the BCH decoder 102 is a message, this message is output with the pattern as shown in FIG. 8C.

FIG. 8A shows the pattern of the address data output from the BCH decoder 102. In FIG. 8A, A0–A17 are 18 bits of actual capcodes, F0–F2 are frame numbers, U0–U1 are serial numbers of the address data and an EN is an enable bit.

Figure 8B:
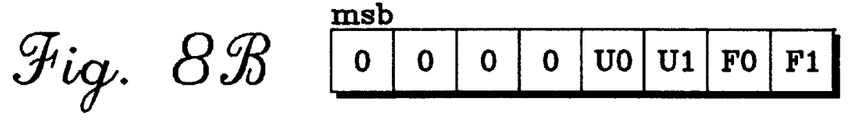
Figure 8C:
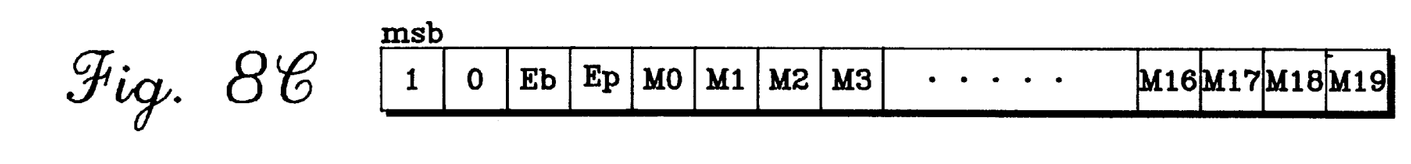

FIG. 8C shows the pattern of the message data output from the BCH decoder 102. The most significant bit (msb) is the data for displaying whether the data output from the BCH decoder 102 is the address data or the message data. If the msb is "0", this means that the data output from the BCH decoder 102 is the address data, while if the msb is "1", this means that the data is the message data. If words of data are continuously received during the scan mode, the controller 15 analyzes the msb data. If the msb data is "1", the controller 15 regards it as the message data and does not process this data, since the message data is inherent information of a corresponding subscriber. Thus, the controller 15 selects only address data and thus rapidly determines the information output from the paging service system (which, in the present invention, refers to the region information). The Eb data in FIG. 8C is the bit for displaying whether or not there occurs any error during the BCH decoding. If the Eb is "1", this means that there occurs more than three bits of errors, on the contrary, if the Eb is "0", this means that there occurs no error. The Ep data in FIG. 8C is the bit for displaying whether or not there occurs any parity error. If the Ep is "1", this means that there occurs a parity error, while if the Ep is "0", this means that there occurs no parity error. M0–M19 are message data.

As described above, if the BCH decoder 102 performs the BCH decoding and error correcting for the received code data and then outputs 24 bits of data, a latch 103 outputs the 24 bits of data to a message bus. In this case, the data output to the message bus are 24 bits of address data and message data.

Referring again to FIG. 4, a scan clock generator 54 generates and outputs a scan latch clock SLCK and a scan transmission clock STCK to a scan transmitting unit 55 for transmitting the address data and message data of each frame during the scan mode. During the scan mode, the scan transmitting unit 55 transmits the address data of all frames within the batch to the controller 15 regardless of its preset frame. Thus, the scan transmission clock STCK is generated in an identical pattern in respective word cycles so as to output the address data and message data in an identical pattern. That is, in a preferred embodiment of the present invention, the patterns of the address data and message data output during the scan mode are identical to each other and are 24 bit-patterns. In this case, the address data contains the information of a corresponding region.

The scan transmitting unit 55 is connected to the message bus of the data decoder 50. The scan transmitting unit 55 is activated upon the generation of the scan control signal SCN, and latches the data of the message bus in response to the scan latch clock SLCK output from the scan clock generator 54. The scan transmitting unit 55 transmits the latched data to the controller 15 in response to the scan transmission clock STCK. The scan transmitting unit 55 transmits the address data and message data output from the data decoder 50 at every word cycle during the scan mode.

Figure 7:
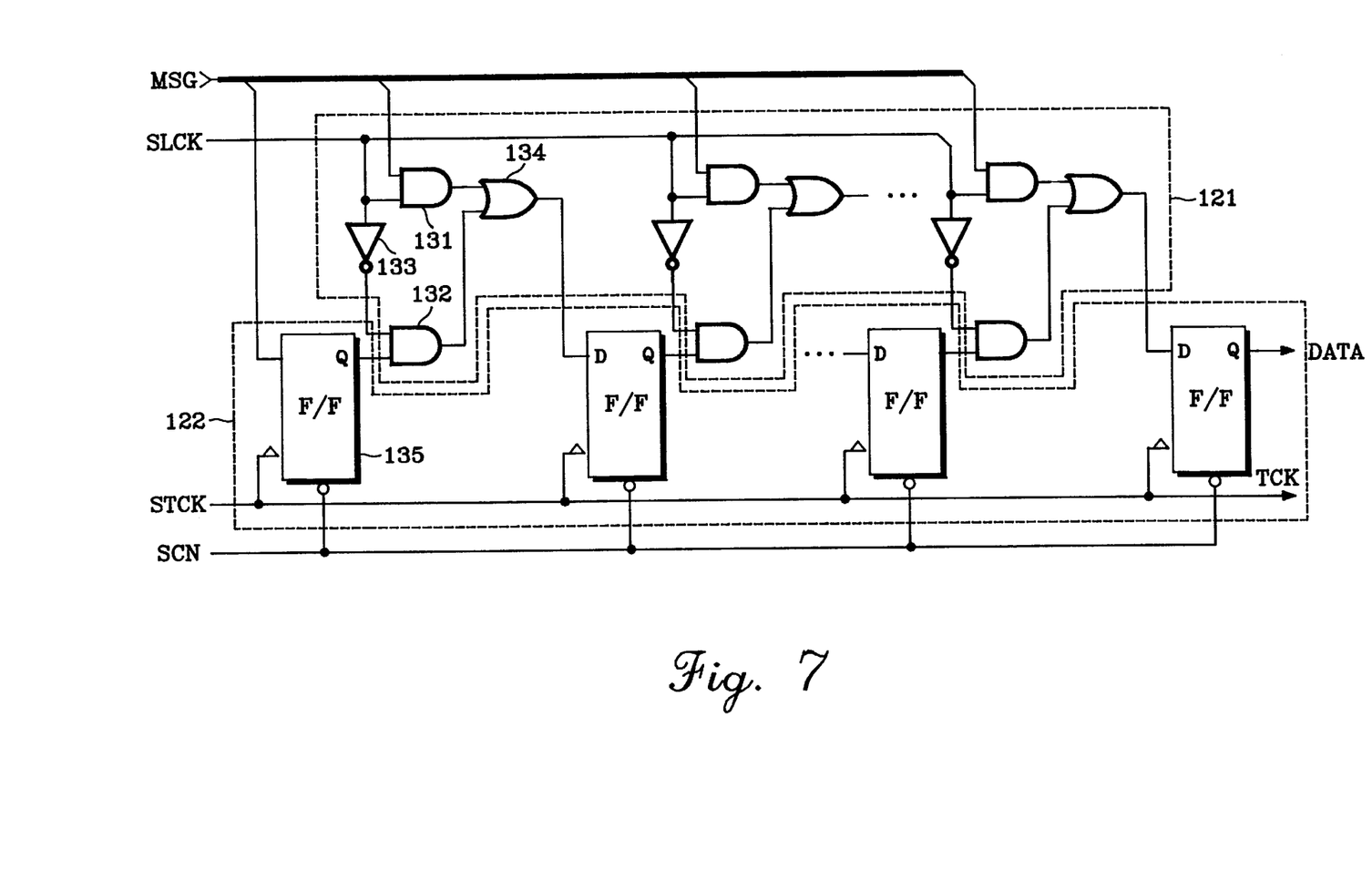
FIG. 7 is a diagram showing a configuration of a scan transmitting unit in FIG. 4.

FIG. 7 shows an illustrative embodiment of the scan transmitting unit 55 according to the present invention. A latch 121 is connected to the message bus and latches the data on the message bus at the generation of the scan latch clock SLCK. Referring to the operation of the latching of one bit of data by the latch 121, an AND gate 131 inputs a designated bit on the message bus and the scan latch clock SLCK and if the scan latch clock SLCK is at the logic "high" level, outputs the corresponding data bit of the message bus. Thus, the AND gate 131 serves to load therein the data on the message bus at the generation of the scan latch clock SLCK. An inverter 133 inverts the scan latch clock SLCK. An AND gate 132 inputs the data of a preceding stage and the inverted scan latch clock. Thus, the AND gate 132 serves to prevent the data of the preceding stage from being transmitted to a following stage when the scan latch clock SLCK is generated, and to form a path for applying the data of the preceding stage to the following stage when the scan latch clock SLCK is cleared. An OR gate 134 ORs the outputs of the AND gates 131 and 132. Thus, the OR gate 134 serves to transmit the output of the AND gate 131 to the following stage when the scan latch clock SLCK is generated and to transmit the output of the AND gate 132 to the following stage when the scan latch clock SLCK is cleared.

A shift register 122 includes 24 D flip-flops 135 and shift-outputs the data transmitted from the latch 121 by the scan transmission clock STCK. Each flip-flop 135 of the shift register 122 has a clear terminal connected to the scan control signal SCN, an input terminal D inputting the data of the preceding stage output from the OR gate 134 in the latch 121, a clock terminal inputting the scan transmission clock STCK and an output terminal Q connected to the AND gate 132 associated with the following stage. Thus, the shift register 122 parallel-loads therein the data on the message bus output from the latch 121 and then serial-outputs the latched data to the controller 15 in response to the scan transmission clock STCK.

The scan transmitting unit 55 transmits the data and transmission clock TCK output during the scan mode to the controller 15.

Referring again to FIG. 4, an address detector 51 is controlled by the scan control signal SCN output from the controller 15, and the address detector 51 stores the capcode in the memory 16 during initial operation under the control of the controller 15. The address detector 51 compares the stored address data with the received address data during the normal mode when the scan control signal SCN is cleared, and if these two address data have an identical value, generates an address detection signal ADET. If the address detection signal ADET is generated, the message data received thereafter becomes the message of a corresponding paging receiver.

Figure 6:
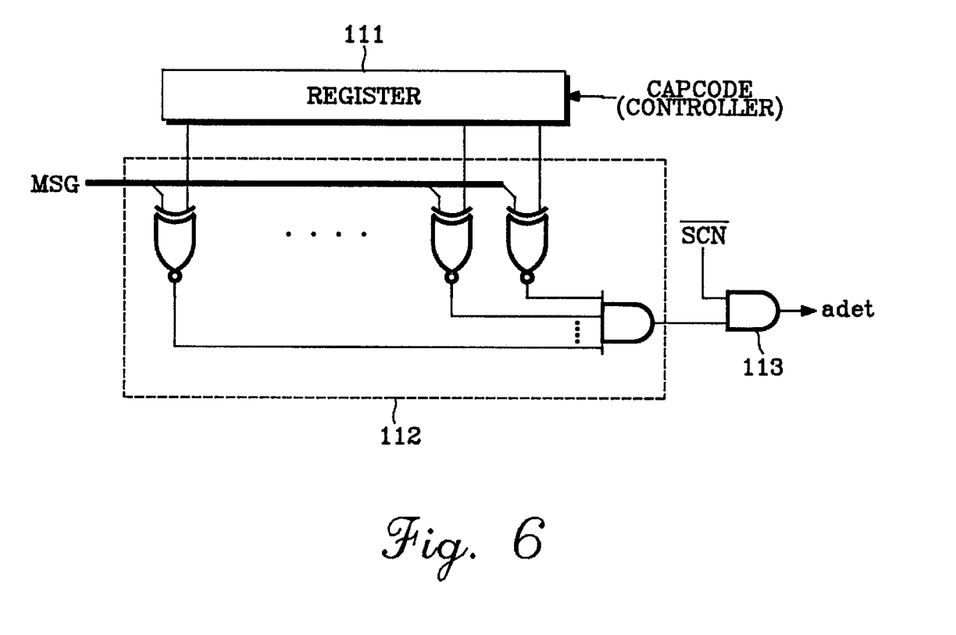
FIG. 6 is a diagram showing a configuration of an address detector in FIG. 4.

FIG. 6 shows an illustrative embodiment of the address detector 51. Referring to FIG. 6, the controller 15 accesses the capcode stored in the memory 16 and stores it in the register 111 during initial operation. Then, the register 111 stores the address data of the paging receiver. A comparator 112 compares the 18 bits of address data stored at the register 111 with the data on the message bus, and if these two data are identical, generates a comparison result signal with a logic "high" level. The comparator 112 may include, for example, 18 exclusive NOR gates and an 18 input AND gate. In this case, each exclusive NOR gate of the comparator 112 inputs the address data stored at the register 111 as the reference data and the address data as shown in FIG. 8A output via the message bus as the comparing data and then the comparator 112 compares these two data. If the reference data has an identical value to the compared data, the exclusive NOR gate outputs a logic "high" signal. An AND gate 113 receives as inputs the output of the comparator 112, and the inverted scan control signal $\overline{SCN}$, and when both of these two inputs have logic "high" levels, the AND gate 113 generates the address detection signal ADET. Thus, the address detector 51 generates the address detection signal ADET when the address stored within the paging receiver is identical to the received address during the normal mode.

Referring again to FIG. 4, a normal clock generator 52 is activated when the address detection signal ADET is generated from the address detector 51, and the normal clock generator 52 generates and outputs to a normal transmitting unit 53 the normal latch clock NLCK and normal transmission clock NTCK for transmitting the address data and message data during the normal mode.

The normal transmitting unit 53 is connected to the message bus of the data decoder 50, and latches the data on the message bus when the normal latch clock NLCK is generated from the normal clock generator 52. The normal transmitting unit 53 serially converts the latched data and transmits it to the controller 15 when the normal transmission clock NTCK is generated. The normal transmitting unit 53 includes an address transmitter for outputting 8 bits of address data as shown in FIG. 8B and a message transmitter for transmitting 24 bits of message data as shown in FIG. 8C. That is, if 24 bits of address data as shown in FIG. 8A is input during the normal mode, the normal transmitting unit 53 converts it into 8 bits of address data as shown in FIG. 8B, and then transmits it to the controller 15. FIG. 8B shows the pattern of the address which is output when the received address is identical to the stored address, i.e. when the address detection signal ADET is generated, in which U0–U1 refer to the detected address numbers and F0–F1 refer to the function bits.

Figure 9:
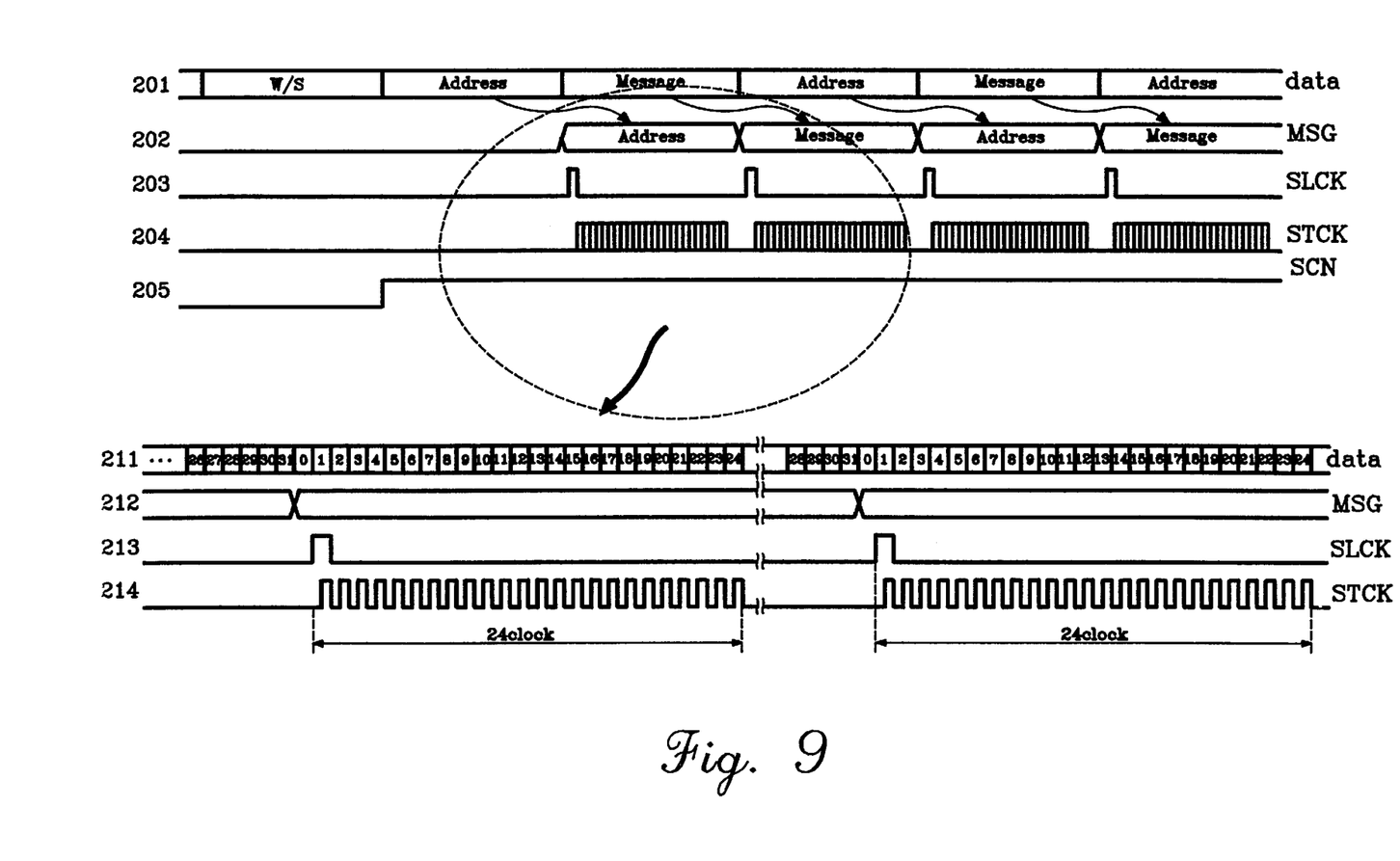
FIG. 9 is a waveform showing operational characteristics when the paging receiver operates in a scan mode according to the present invention.
Figure 10:
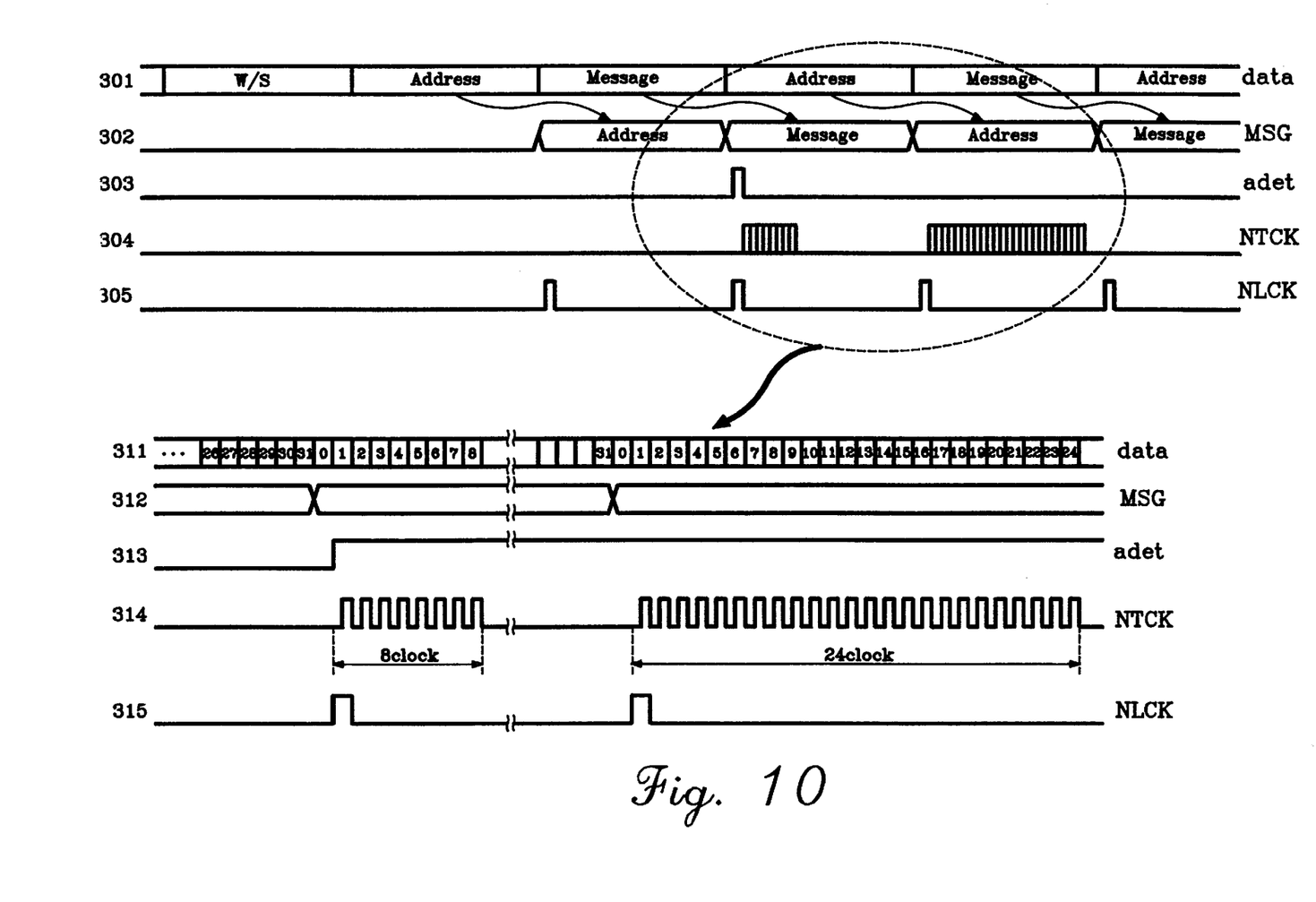
FIG. 10 is a waveform showing operational characteristics when the paging receiver operates in a normal mode according to the present invention.

FIG. 9 is a waveform showing the characteristics during the scan mode according to the present invention and FIG. 10 is a waveform showing the characteristics during the normal mode. The operation of the paging receiver of the present invention will be discussed in detail with reference to FIGS. 9 and 10.

First, the operation during the scan mode will be discussed with reference to FIG. 9. During the scan mode, the controller 15 outputs the scan control signal SCN as shown in 205 of FIG. 9. When the scan control signal SCN is activated to a logic "high" level, the AND gate 113 of the address detector 51 outputs a logic "low" signal, thereby deactivating the normal clock generator 52. In addition, the shift register 122 of the scan transmitting unit 55 is cleared from the clear state, thereby transmitting the data on the message bus.

Referring again to FIG. 4, the battery controller 40 has a frame detector, a wordsync detector and an end transmission detector. At the execution of the batch mode, the wordsync detector generates the wordsync detection signal WSD whenever the wordsync is detected from the POCSAG code as shown in FIG. 2. The end transmission detector generates the end transmission detection signal ETX when the end transmission data is detected upon changing from the batch mode to the idle mode. Thus, the flip-flop 41 activates the data section signal LWSD when the initial word sync detection signal WSD is generated after detecting the preamble during the batch mode. Since the flip-flop 41 clears the data section signal LWSD when the end transmission detection signal is generated, it can be seen that the data section signal LWSD is activated at the section where the data stream is transmitted during the batch mode.

The AND gate 42 ANDs the data section signal LWSD and the scan control signal SCN and then outputs the scan battery saving signal SBSS. If the wordsync data is detected, the scan battery saving signal SBSS is generated which can continuously detect the data stream of all frames regardless of the preset frame. The scan battery saving signal SBSS is applied as the battery saving signal BSS to the switch 13 by the OR gate 43. Thus, the receiving unit 11 continuously receives the information as shown in 2b of FIG. 2 at the cycle where there is the data stream and then transmits it to the decoding unit 20.

Then, the data decoder 50 receives the data stream 201 as shown in FIG. 9 from the receiving unit 11 and decodes and outputs it as decoded data 202 shown in FIG. 9. In this case, the data stream is the data of all frames, and the data of each frame is the address data and the message data as shown in 2d of FIG. 2. That is, the shifter register 101 of the data decoder 50 parallel-converts the serial data stream 201 output from the receiving unit 11 as shown in FIG. 9 in the unit of word (32 bits), and the BCH decoder 102 decodes and error-corrects the word unit of data output from the shift register 101 and then outputs it as decoded data 202 shown in FIG. 9. The data output from the BCH decoder 102 is 24 bits of address data as shown in FIG. 8A and 245 bits of message data as shown in FIG. 8C and is output to the message bus by the latch 103 after being delayed by 1 word cycle.

The scan clock generator 54 generates the scan latch clock SLCK 203 as shown in FIG. 9 at the starting point of every word cycle of the data stream 201 received as shown in FIG. 9 when the scan control signal SCN is generated, and generates the scan transmission clock STCK 204 as shown in FIG. 9 after the scan latch clock SLCK is generated. This allows the scan transmitting unit 55 to transmit 24 bits of address data output from the data decoder 50 to the controller 15 during the scan mode.

Then, the scan transmitting unit 55 latches therein the data on the message bus in response to the scan latch clock SLCK. After latching, the scan transmitting unit 55 transmits the latched data to the controller 15 in response to the scan transmission clock STCK.

The waveforms shown in 211–214 of FIG. 9 illustrate in detail the characteristics of transmitting the data bits on the message bus during the scan mode.

As described above, the data output from the scan transmitting unit 55 is the address data and message data. The controller 15 analyzes the address data output from the scan transmitting unit and checks the present state of the paging receiver during the scan mode. In this case, since the scan transmitting unit 55 outputs the address data and message data of all frames regardless of the preset frame, the controller 15 can promptly analyze the information contained in the address data during the scan mode.

After checking a current state of the paging receiver by operating in the scan mode as described above, the controller 15 changes the scan control signal SCN 205 as shown in FIG. 9 to the logic "low" level, thereby releasing the paging receiver from operating in the scan mode. Then, the controller 15 controls the checked state of the paging receiver according to the address data and then operates in the normal mode. That is, if the scan mode is cleared, the scan battery saving signal SBSS changes to the logic "low" level. Thus, the operation is controlled by the normal battery saving signal NBSS generated from the battery controller 40. Then, the battery saving signal BSS is generated only at the preset frame cycle during the batch mode.

The normal mode operation will be discussed with reference to FIG. 10. During the normal mode, the controller 15 changes the scan control signal SCN to a logic "low" level. Then, the shift register 122 of the scan transmitting unit 55 becomes the clear state, thereby deactivating the scan transmitting unit 55. The scan control signal SCN with a logic "low" level is inverted to the logic "high" level by the inverter 58 of FIG. 4 and then is applied to the AND gate 113 of FIG. 6. Since the scan control signal SCN is deactivated, the address detector 51 compares the stored data with the received address data at the preset frame cycle. An illustrative embodiment of the address detector 51 is shown in FIG. 6, and the register 111 stores the capcode in the memory 16 under the control of the controller 15 during initial operation. The comparator 112 compares the address data output from the register 111 with the data 302 on the message bus received as shown in FIG. 10. If the received 18 bits of address data are identical to the data of the register 111, the address detection signal ADET 303 as shown in FIG. 10 is generated.

If the address detector 51 generates the address detection signal ADET, the normal clock generator 52 generates the normal latch clock NLCK 305 as shown in FIG. 10 and generates the normal transmission clock NTCK 304 as shown in FIG. 10 at the preset frame cycle. During the normal mode, the data is received only at the preset frame, and the address data to be transmitted to the controller 15 at the preset frame cycle is 8 bits as shown in FIG. 8B and the message data is 24 bits as shown in FIG. 8C. The normal clock generator 52 generates 8 bits of the normal transmission clock NTCK at the address word section of the preset frame section and 24 bits of the normal transmission clock NTCK at the message word section of the preset frame section.

Then, the normal transmitting unit 53 latches the data on the message bus in response to the normal latch clock NLCK 305 as shown in FIG. 10, and generates the address data as shown in FIG. 8B. The normal transmitting unit 53 transmits 8 bits of address data and 24 bits of message data to the controller 15 in response to the normal transmission clock NTCK 304 as shown in FIG. 10.

The waveforms shown in 311–315 of FIG. 10 illustrate in detail the characteristics of transmitting the data on the message bus during the normal mode.

The decoding unit 20 transmits the data received as described above to the controller 15. However, the transmission operation of the decoding unit 20 can be processed using software by the controller 15 or by an additional battery controller. In this case, the battery controller 40 must be able to generate the scan battery saving signal SBSS and the normal battery saving signal NBSS as described above.

Figure 11:
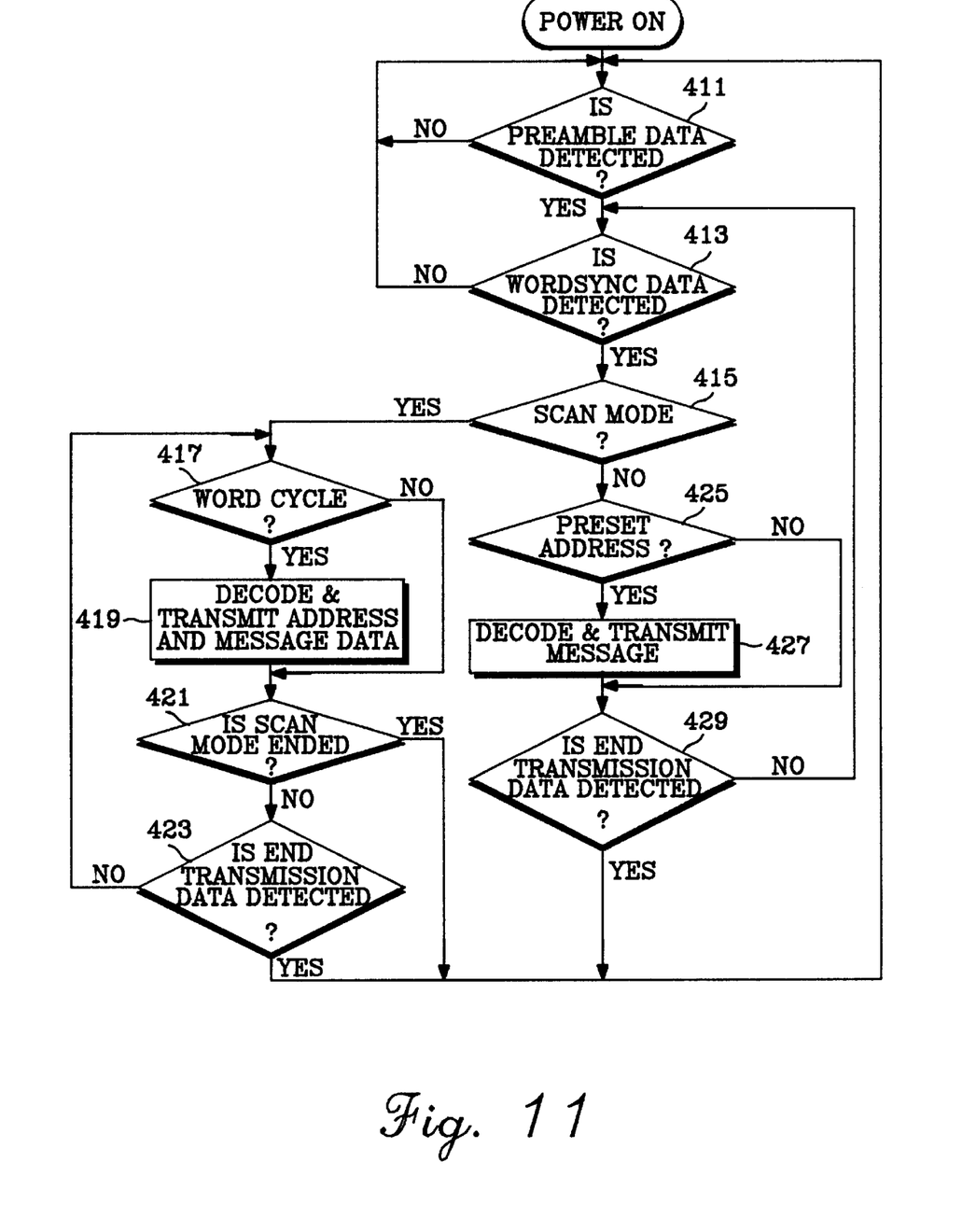
FIG. 11 is a flowchart showing the steps of controlling the data transmission of the paging receiver according to the present invention.

FIG. 11 is a flowchart showing the steps of receiving and transmitting the data according to the present invention. The decoding unit 20 transmits the data to the controller 15 during the scan mode and normal mode under the control of the controller 15.

The battery controller 40 is disclosed in detail in Korean Patent Application Serial No. 26760/1994. The battery controller 40 includes a preamble detector, a wordsync detector and a preset frame detector, and generates the normal battery saving signal NBSS for receiving the preamble data during the idle mode and generates the normal battery saving signal NBSS for receiving the preset frame data during the batch mode.

During the idle mode, since the receiving unit 11 is supplied with the operating power by the normal battery saving signal NBSS at a predetermined cycle, the receiving unit 11 applies the received data to the battery controller 40, and the battery controller 40 checks in step 411 whether or not the preamble data is received. If it is checked that the preamble data is received, the battery controller 40 checks in step 413 whether or not the wordsync data is received.

If the preamble data and initial wordsync data are detected, the flip-flop 41 activates the data section signal LWSD. The controller 15 generates the scan control signal SCN when the mode key is received from the key input unit 10. Then, the AND gate 42 activates the scan battery saving signal SBSS by the scan control signal SCN having a logic "high" level. The scan battery saving signal SBSS is generated as the battery saving signal BSS which has a logic "high" level at all frame data sections after the wordsync data is detected. Thus, the receiving unit 11 is continuously supplied with the operating power regardless of the preset frame section after the wordsync data is detected. Accordingly, the receiving unit 20 supplies the received data of all frames to the decoding unit 20. If the scan control signal SCN is activated to the logic "high" level, the scan transmitting unit 55 is activated and the address detector 51 is deactivated.

In step 415, the decoding and transmitting unit detects whether or not it is operating in the scan mode. If it is the scan mode, in steps 417 and 419, the data decoder 50 decodes the data output from the receiving unit 11 in a data word, and the scan transmitting unit 55 transmits the data word of address data and frame data output from the data decoder 50 to the controller 15. At this time, the receiving unit 11 receives all frame data by the scan battery saving signal SBSS. Thus, the data transmitted from the scan transmitting unit 55 to the controller 15 are the address data and message data of all frames.

Then, the controller 15 analyzes the information contained in the address data and checks the present state of the paging receiver. In the preferred embodiment of the present invention, the region information of the paging service system is contained in the address data, and the paging receiver can service the paging function by varying the frequency of the corresponding region according to this region information. In this case, the controller 15 receives the address data of all frames during the scan mode regardless of the preset frame and rapidly checks the information of the region where the paging receiver is presently located. Then, the controller 15 controls the frequency synthesizer 19 to set the channel frequency of the corresponding region, accesses the capcode of the corresponding region from the memory 16, and then stores it in the address detector 51. Thereafter, the controller 15 clears the scan control signal SCN, for operating in the normal mode.

If the scan control signal SCN is deactivated to a logic "low" level, the scan battery saving signal SBSS is cleared by the AND gate 42 and thus the normal battery saving signal NBSS output from the battery controller 40 becomes the battery saving signal BSS. Thus, the decoding unit 20 generates the normal battery saving signal NBSS for detecting the preamble data during the idle mode. If the preamble data is detected, generates the normal battery saving signal NBSS for receiving the data of the preset frame section. In step 421, the scan transmitting unit 55 is deactivated and the address detector 51 is activated by the scan control signal SCN having a logic "low" level.

However, if the battery controller 40 detects the end transmission data during the scan mode, i.e. in the state when the scan control signal SCN has a logic "high" state, the flip-flop 41 is cleared, deactivating the scan battery saving signal SBSS. That is, in step 423, the battery controller 40 determines whether the end transmission data is detected during the scan mode. If it is determined that the end transmission data has been detected, the battery controller 40 stops generating the battery saving signal BSS and returns to step 411.

If it is determined in step 415 that it is not operating in the scan mode, i.e. it is the normal mode, in steps 425 and 427, the data decoder 50 decodes the address data and message data of the preset frame section, the address detector 51 generates the address detection signal if the received address data is identical to the preset address data, and the normal transmitting unit 53 transmits 8 bits of address data and 24 bits of message data at the preset frame section. The battery controller 40 determines in step 429 whether the end transmission data has been detected. If it is determined that the end transmission data has not been detected, the battery controller 40 returns to step 413, and if it is determined that the end transmission signal has been detected, the battery controller 40 returns to step 411.

As described above, in the preferred embodiment of the present invention, the paging service system transmits the address data containing the region information, and the paging receiver analyzes the region information contained in the address data and then is tuned to the channel frequency of the corresponding region to perform the paging function. However, it can be predicted that the scan mode of the present invention can also be used in the case of transmitting the address data containing other information from the paging service system.

As described above, the paging receiver operates in the channel scan mode during initial operation, thereby analyzing the address data of all frames in the section where the data stream is received regardless of the preset frame. Accordingly, it is possible to rapidly detect the region where the paging receiver is presently located, enhancing the use of the paging function. In addition, the battery saving signal is supplied only to the section where the data is received during the normal mode, thereby saving the power of the battery.

While there has been illustrated and described what is considered to be preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A data processing device of a paging receiver having a controller for analyzing decoded paging data for performing a paging function, comprising:

a decoder, operatively coupled to the controller, for decoding and transmitting to the controller address data and message data of all frames in a section of a received data stream during a scan mode of operation wherein said controller determines a region in which the pager receiver is located from said address data, sets a channel frequency of the paging receiver corresponding to said determined region and ends said scan mode of operation, wherein address data and message data of a preset frame of said set channel frequency of the received data stream are transmitted to the controller during a normal mode of operation of the paging function.

2. The data processing device of claim 1 further comprising:

a memory for storing inherent address information; and wherein the controller, responsive to the address data at the preset frame being identical to the inherent address information during operation in the normal mode, receives the message corresponding to the message data and performs the paging function to output the message.

3. The data processing device of claim 1 further comprising:

a frequency synthesizer for designating said channel frequency of a receiving unit for receiving the data stream.

4. The data processing device of claim 1 wherein the decoder decodes the data stream using binary-coded hexadecimal (BCH) methods.

5. The data processing device of claim 1 further comprising:

a receiving unit for receiving the data stream; and a battery unit for applying operating power to the receiving unit.

6. The data processing device of claim 1 further comprising:

the decoder for generating a battery saving signal; and a switch, responsive to the battery saving signal, for controlling the application of operating power to the receiving unit.

7. The data processing device of claim 1 further comprising:

an alert generating unit, responsive to the controller receiving the message data, for generating an alert signal.

8. The data processing device of claim 7 wherein the alert generating unit includes a circuit for generating an alert tone as the alert signal.

9. The data processing device of claim 7 wherein the alert generating unit includes a vibrator for generating a vibration signal as the alert signal.

10. A paging receiver comprising:

a first controller for generating a scan control signal to activate a scan mode of operation during which the first controller analyzes received address data to check for region information so as to determine the region in which the paging receiver is located, and for deactivating the scan control signal after the region of operation is determined so as to activate a normal mode of operation;

a battery controller for generating a scan battery saving signal to receive the data of all frame sections when the scan control signal is activated;

a power supply unit which is switched on when a battery saving signal is generated to supply operating power;

a receiving unit which is supplied with the operating power and receives the data stream; and a transmitting unit including a decoder for decoding the address data of all frames output from the receiving unit, and a transmitter for transmitting the address data to the first controller; wherein, during the scan mode, the receiving unit receives the address data of all frames, analyzes the region information in the address data, and sets a channel frequency of a region corresponding to the determined region information.

11. A data processing method of a paging receiver, comprising the steps of:

activating a scan mode of operation with a scan control signal output from a controller of the paging receiver to receive address data of all frames at a section of a received data stream, the address data including region information;

analyzing the region information in the address data to determine the region in which the paging receiver is located;

setting a channel frequency of a region corresponding to the region information;

deactivating the scan control signal from the controller so as to end the scan mode of operation and activate a normal mode of operation of the paging receiver; and transmitting the address data and message data of a preset frame to the controller during the normal mode of operation for performing the paging function.

12. The data processing method of claim 11 further comprising the steps of:

storing inherent address information in a memory;

determining a condition of the address data at the preset frame being identical to the inherent address information, during operation in the normal mode, for receiving the message corresponding to the message data; and performing the paging function to output the message.

13. The data processing method of claim 11 further comprising the steps of:

receiving the data stream; and decoding the data stream using binary-coded hexadecimal (BCH) methods to generate the address and message data.

14. The data processing method of claim 13 further comprising the step of:

generating an alert signal, using an alert generating unit, responsive to the controller receiving the message data.

15. The data processing method of claim 14 further comprising the step of:

generating an alert tone as the alert signal.

16. The data processing method of claim 14 further comprising the step of:

generating a vibration signal as the alert signal using a vibrator.

* * * * *